Dec. 8, 1959  G. P. FELTS ET AL  2,915,928
APPARATUS FOR STRIPPING WIRES AND CABLES
Filed Jan. 28, 1957  2 Sheets-Sheet 2
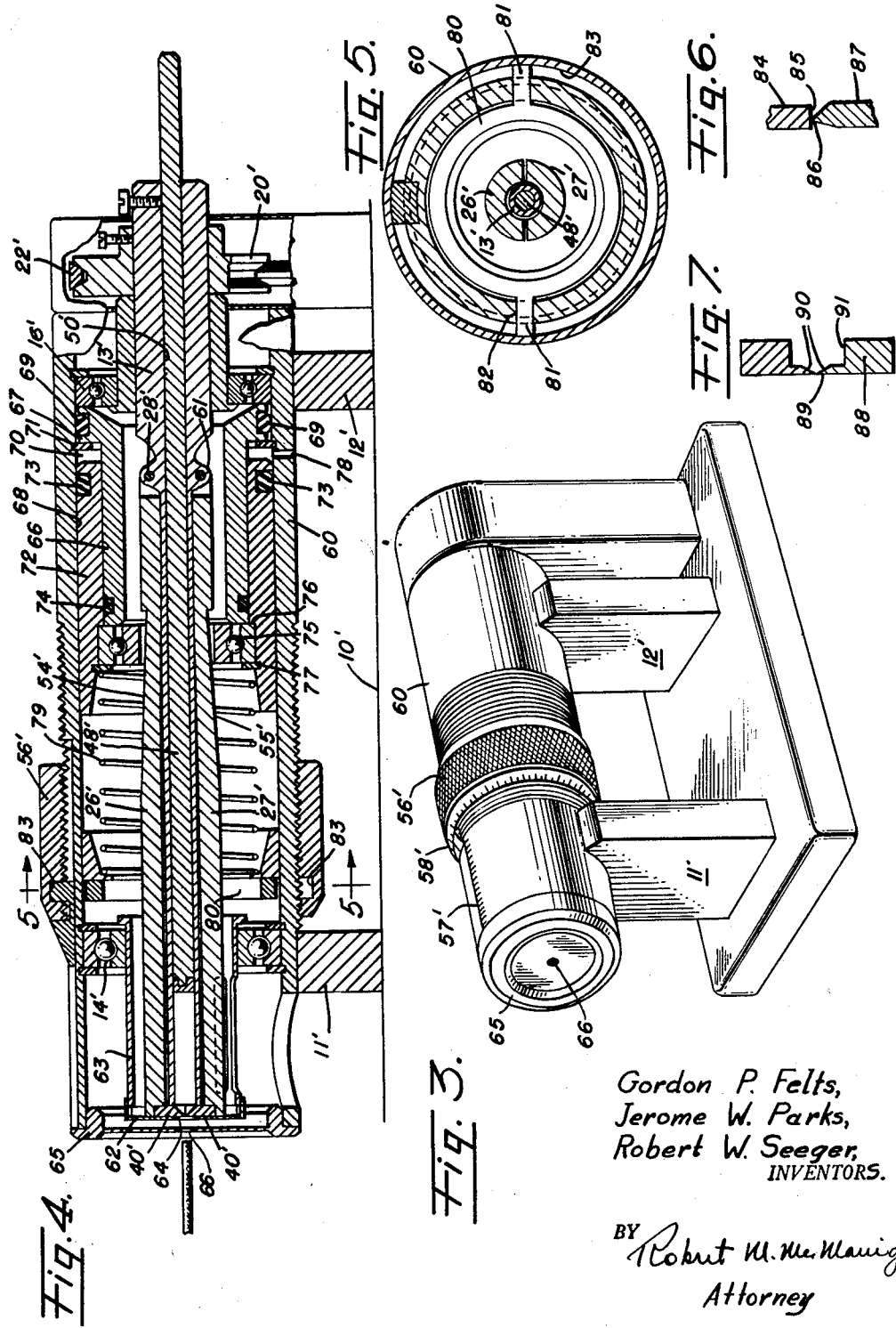
Gordon P. Felts,
Jerome W. Parks,
Robert W. Seeger,
INVENTORS.
BY Robert M. McManigal
Attorney

United States Patent Office 2,915,928
Patented Dec. 8, 1959

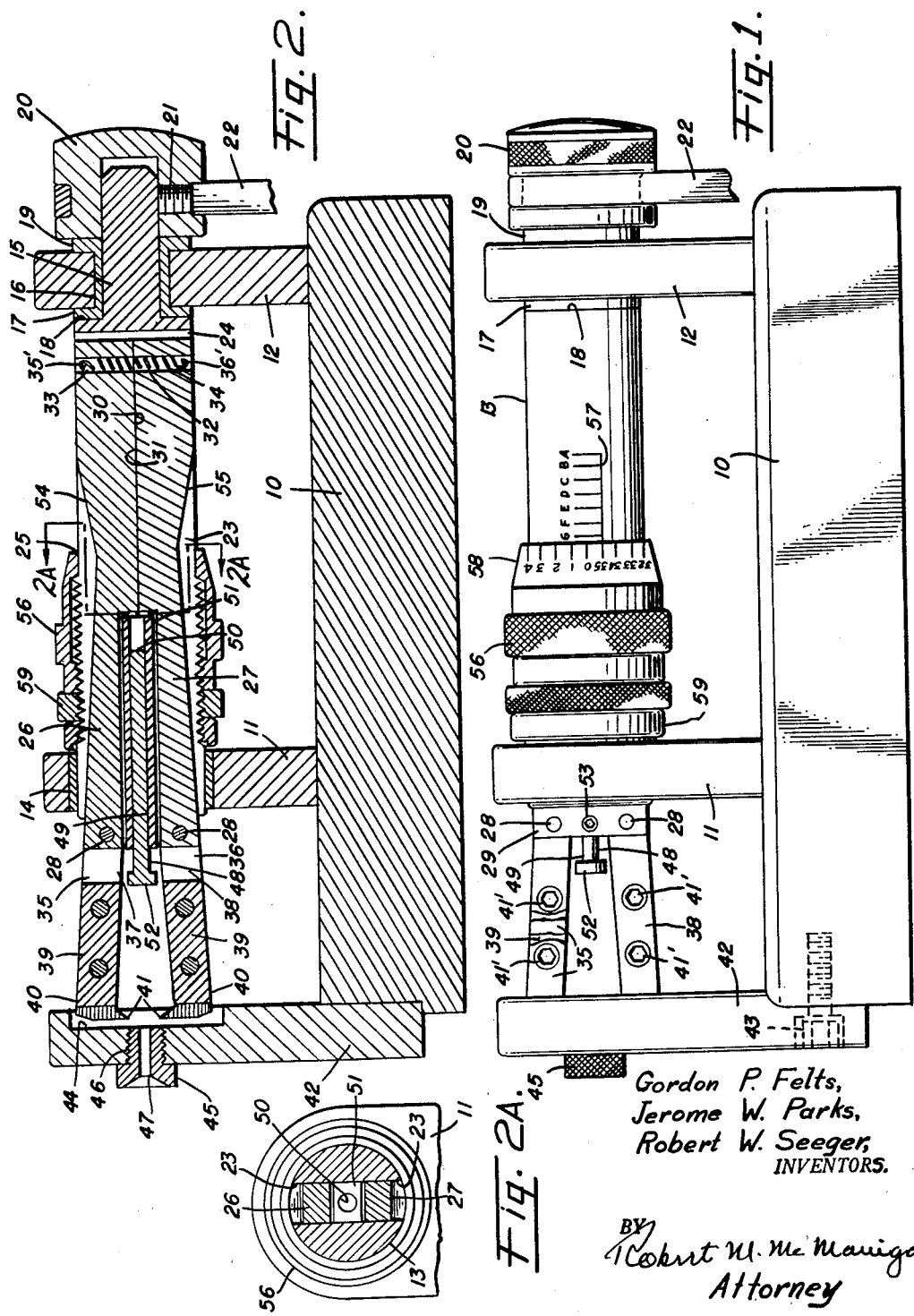

2,915,928

APPARATUS FOR STRIPPING WIRES AND CABLES

Gordon P. Felts, Sierra Madre, Jerome W. Parks, Balboa Island, and Robert W. Seeger, Pasadena, Calif., assignors to Microdot Inc., South Pasadena, Calif., a corporation of California Application January 28, 1957, Serial No. 636,798

15 Claims. (Cl. 81—9.51)

The present invention relates generally to apparatus for cutting insulation and coverings from wires and/or cables, and is more particularly concerned with apparatus of this character which may be adjusted and controlled with an extremely high degree of accuracy.

Apparatus for this purpose has not heretofore been generally suitable for use with extremely fine wire sizes nor could it be utilized in connection with coaxial cables where it may be desirable and necessary at times to successively remove different lengths of the insulation, conducting sheath and cover so as to expose these portions in a stepped arrangement at the wire end. Such an operation requires an extremely high degree of accuracy and control, and the necessary operation of a device in which the cutting elements may be controlled in cutting depth within very close tolerances. In other words micro adjustments become necessary. For example, coaxial cables may have dimensions in the order of a central wire of .011 inch diameter, an insulating cover of .036 inch diameter, a sheath in the order of .055 inch diameter and an overall cover of .065 inch diameter. It will therefore be apparent that removal of insulation from the central conducting wire would require setting the cutting depth of the cutting element so that it would cut through the insulation to a depth of .0125 inch, and that in so doing it would not cut the conducting wire. Equally close tolerances would be required in cutting through the sheath and overall cover without damaging the underlying elements.

Having in mind the inherent disadvantages and inaptness of presently available apparatus in connection with very fine wires and cables, it is one object of the present invention to provide stripping apparatus of simple vigorous construction wherein unique micro adjustments may be employed to control the cutting depth of the cutting elements.

A further object is to provide a device of the character described in which the cutting elements will be actuated to a cutting position in response to motivation of the apparatus, and wherein the cutting elements will be actuated to non-cutting position upon terminating the apparatus operation.

A still further object is to provide a cable stripper which embodies novel pneumatic power actuating means.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is an elevational view of a cable stripping apparatus embodying the features of the invention;

Fig. 2 is a longitudinal section of the same, showing the cooperative relationship of the various components;

Fig. 2A is a transverse section, taken substantially on line 2A—2A of Fig. 2;

Fig. 3 is an isometric view of a modified construction;

Fig. 4 is a longitudinal section taken through the modified structure, showing the cooperative relationship of the power means for actuating the cutting elements, and the micro adjustment thereof;

Fig. 5 is a transverse sectional view, taken substantially on line 5—5 of Fig. 4;

Fig. 6 is a fragmentary section diagrammatically illustrating one type of cutter elements which may be utilized; and Fig. 7 is a fragmentary view diagrammatically illustrating the construction of another type of cutter which may be utilized.

Referring generally to the drawings, for illustrative purpose, there is disclosed in Fig. 1 cable stripping apparatus which embodies a base structure which may take the form of a base plate 10 or other suitable structure upon which the cooperatively associated cable stripping parts may be supported. In the present instance, the base plate is secured to spaced upstanding bearing brackets 11 and 12. These brackets rotatably support an elongate rotor 13 of generally cylindrical construction. This rotor is supported at one end in a suitable bearing 14 carried by the bracket 11, and its other end, which is provided with a contracted or reduced end portion 15, in a bearing 16 which serves as a thrust bearing. The bearing 16 has an inner end flange 17 adapted to bear against an adjacent radially extending shoulder 18, and an outer end flange 19 adapted to bear against the inner face of a pulley member 20. This pulley is retained on the outer end of the reduced end portion 15 by means of a suitable set screw 21 and is peripherally grooved to receive a driving belt 22 by which suitable power means such as an electric motor (not shown) may be utilized to rotate the rotor 13.

As shown most clearly in Figures 2 and 2A, the rotor 13 is formed with a transverse slot 23 which extends from a point 24, adjacent the flange 18, to the end of the rotor which is rotatably supported in the bearing 14. The slot 23 thus forms a pair of spaced rotor arms 25—25 (one only being shown) between which a pair of elongate actuating arms 26 and 27 are positioned.

The arms 26 and 27 are similarly constructed and are respectively supported intermediate their ends upon pivot pins 28 which extend through end projections 29—29 respectively formed at this end of the rotor arms 25—25.

The innermost ends of the actuating arms 26 and 27 are provided with confronting abutment edges 30 and 31 which are so arranged that when these edges are in abutting engagement, the outer ends of the actuating arms will be in outwardly diverging relation, but upon separating the abutment edges 30 and 31 will cause the outer ends of the actuating arms to swing towards each other for a purpose which will subsequently be described. The abutment edges 30 and 31 are normally biased into engagement by means of a tension spring 32 which is retained in aligned transversely extending bore passages 33 and 34 in this end of the arms, the respective ends of the tension spring being secured by anchor pins 35' and 36' respectively.

The outer ends of the actuating arms 26 and 27 are provided with end slots 35 and 36 which respectively form spaced end lugs 37—37 on the arm 26, and end lugs 38—38 on the arm 27. The slots 35 and 36 are adapted in each case to receive therein shank portions 39 of cooperative cutter blades 40, the shank portions being adapted to be clampingly secured between the end lugs by clamping bolts 41'. The cutter blades, as shown in Fig. 2, have confronting working cutting edges 41—41 which are normally retained in spaced apart or non-cutting position by the action of the tension spring 32. The mass of the ends of the arms 26 and 27 extending to the left of the pivots 28 and the cutter blades carried thereby is relatively small as compared to the mass of the other ends of the arms 26 and 27 extending to the right of the pivots 28. Thus upon rotation of the rotor 13, the greater centrifugal force acting on the right side of the pivots 28 will overbalance the centrifugal force acting on the left side of the pivots 28 and the action of the tension spring 32, whereupon the abutment edges 30 and 31 will be moved away from each other.

At the left end of the base plate 10, as viewed in Figs. 1 and 2, an upstanding face plate 42 is provided, this face plate being secured as by bolts 43—43 to the base plate. The face plate 42 at its upper end is provided with a recess 44 on its inner surface for receiving the ends of the cutters therein. Also, centrally positioned of the recess 44 is a tubular bushing 45 having a threaded stem 46 by means of which it is mounted in the face plate. This bushing is formed with an axially extending bore passage 47 which is flared at its outer end to facilitate the entrance of a cable endwise into the bore passage by which it may be guided between the cutting edges 41 of the cutter blades for performing a stripping operation thereon.

In order to regulate the length of material to be stripped from the cable, means are provided to determine the extent of cable which will be inserted between the cutting edges of the cutting blades. Various arrangements may be provided for this purpose. In the present instance, there is provided an index rod 48 which has an elongate shank portion 49 supported for axial adjustment in a passage 50 of a bridging portion 51 extending between and interconnecting the respective rotor arms 25—25. This index rod has a head end 52 against which the end of the inserted cable will abut. The index rod is held in position by means of a set screw 53.

With the arrangement thus far described, it will be apparent that the operation of the cutters may be accomplished automatically merely by starting and stopping of the rotation of the rotor 13. That is, as previously explained the cutters are retained in non-cutting position during such time as the rotor is not being rotated. This is accomplished by the action of the tension spring 32, as previously explained. However, when the rotor is rotated, the action of centrifugal force moves the abutment edges 30 and 31 out of engagement against the action of the spring 32, and as a result brings the working edges of the cutter blades into a cutting position. In order that this cutter may be successfully utilized for the cutting of precision controlled depths of material of the cable, novel means are provided for adjustably varying the extent of outward movement of the inner ends of the actuating arms under the action of centrifugal force. This is accomplished by providing inclined edges which form tapers 54 and 55 respectively on the actuating arms. These tapers are cooperatively associated with a nut 56 which is threadedly adjustable longitudinally of the rotor 13, interengaging threads being provided on the outer surface of the rotor arms, and the inner surface of the nut. The right end of the nut 56, as viewed in Fig. 2, is in the path of movement of the arms 26 and 27 and will be engaged by the tapers 54 and 55 thereof, when the adjacent ends of the arms move outwardly under the action of centrifugal force. It will be evident that by adjusting the nut 56 along the rotor, it is possible through the use of an appropriate graduated scale 57 on the rotor and circumferentially spaced graduations 58 on the associated end of the nut 56 to obtain a micrometer adjustment in the cutting depth of the cutter blades. The position of the nut 56 may be retained in any desired setting by means of an associated stop or lock nut 59. The operation of the form of the invention shown in Figs. 1 and 2 will now be described briefly. Having set the index rod 48 for the amount of material to be stripped, and adjusted the nut 56 for the desired cutting depth of the cutter blades, the cable end is inserted through the passage 47 until it strikes the head 52 of the index rod. This is done prior to rotating the rotor 13.

The rotor 13 is then energized and as its speed of rotation increases, the ends of the arms 26 and 27 on the opposite side of the pivots 28 from the end carrying the cutter blades move outwardly under the action of centrifugal force against the opposition of the tension spring 32. This operation moves the cutting blades into cutting position, and as they rotate around the cable the material is circumferentially cut to the preset depth. If the cable end is now manually withdrawn while the rotor 13 is rotating, and the blades are in cutting position, the blades act to pull the severed end portion material from the cable end. Thus, the insulation covering may be removed to leave a bare projecting end portion of a central conductor. The rotor is stopped prior to inserting the next cable end. Upon stopping the rotor the spring 32 acts to restore the arms 26 and 27 to a position in which the cutter members are separated for reception of the next cable end to be operated upon.

Referring now to Fig. 4, a modified construction is disclosed in which the cutting blades are actuated by pneumatic power means. In this form of the invention, a tubular housing 60 is supported upon brackets 11'—12', and the rotor 13' is in this case rotatably supported upon an anti-friction bearing 16' at one end of the tubular housing, and upon an anti-friction bearing 14' at the other end of the tubular housing.

This arrangement differs from that previously described in that the actuating arms 26'—27', instead of being pivoted between their ends, are pivoted at one end by means of pivot pins 28'—28' in each case which pivotally connect the arms to supporting lugs 61—61 carried by the rotor 13'.

At the opposite ends or free ends of the arms 26'—27', cutters 40'—40' are appropriately secured to the arm ends. A cover cap 62, connected to the adjacent end of the rotor 13', extends over the cutters and is secured at its periphery to one end of a sleeve 63 which is rotatably supported in the anti-friction bearing 14'. This cap, sleeve and bearing assembly thus provide a support for this end of the rotor 13'. An entrance opening 64 in the cap permits insertion of a wire or cable between the cutters. If desired, this end of the housing may also be closed by a front cover 65 having a registering opening 66 axially aligned with the entrance openings 64. The amount of cable to be inserted is in this case controlled by an index rod 48' which extends through an elongate bore passage 50' of the rotor.

The primary difference in the operation of the actuating arms 26' and 27' in this form of the apparatus resides in the fact that these arms are moved outwardly under the action of centrifugal force in order to move the cutters into a non-cutting position, while power means are utilized for actuating the arm against the action of centrifugal force in a direction to move the cutters into a cutting position. In this arrangement the rotor continues to operate at all times and the actuation of the arms is accomplished by means of a pneumatic power device which will now be described in detail.

As shown in Fig. 4, within the right end of the tubular housing 60, there is provided an inwardly spaced sleeve 66 having a radial flange 67 at one end which serves to position the sleeve with respect to the inner surface 68 of the tubular housing 60, and is provided with a sealing ring 69 to seal this end of the sleeve and form an annular cylinder 70 between the sleeve 66 and the inner surface 68 of the housing. The sleeve 66 is retained longitudinally in position by means of the abutment of the flange 67 with the outer race of anti-friction bearing 16' on one side and a retaining ring 71 on the other side of the flange.

Associated with the annular cylinder 70 and reciprocably mounted therein is a sleeve piston 72 which is sealed at its innermost end by means of a sealing ring 73 with respect to the surface 68. The inner surface of the sleeve piston is sealed with respect to the outer surface of the sleeve 66 by means of a sealing ring 74 mounted on the sleeve end.

The left end of the sleeve piston, as viewed in Fig. 4, carries an anti-friction bearing 75, the outer race of this bearing being secured between a piston shoulder 76 and a retaining ring 77, while the inner race of this bearing is positioned so as to extend around the rotor 13' and the arms 26'—27'. By admitting an appropriate operating fluid, such as air into the cylinder behind the piston, through an inlet 78 it is possible to move the piston so as to carry the anti-friction bearing 75 along the actuating arms and over tapers 54' and 55' in this case so as to move the arms inwardly in a direction to move the cutters 40' and into cutting position, against the action of centrifugal force. Movement of the sleeve piston 72 in the direction just described is against the action of a compression spring 79 having one end bearing against the retaining ring 77, and its other end bearing against stop ring 80 which is supported for axial adjustment longitudinally of the tubular housing 60 so as to regulate and limit the movement of the cutters towards cutting position, and to thus determine the cutting depth of the cutters. Upon relieving the air pressure in the cylinder, the spring 79 acts to retract the piston 72 and thus release the arms for outward swinging movement under the action of centrifugal force to separate the cutters.

Adjustment of the cutting depth is similarly accomplished in this case by means of the nut 56' which is threadedly supported on the tubular housing, in this arrangement. This nut is provided with circumferentially spaced graduations 58' which are in turn associated with a graduated scale 57' extending along the tubular housing 60.

As shown in Fig. 5, the stop ring 80 is provided with diametrically positioned projections 81 which extend through appropriate slots 82 in the tubular housing 60 and into an internal groove 83 of the nut 56' so that upon adjusting movements of the nut, the stop ring 80 will be correspondingly moved.

The operation of the modified construction shown in Fig. 4 may be described briefly as follows. The cutting action of the blades and the manner of stripping the severed material from the cable end is basically as previously described for the device shown in Fig. 2. The main difference resides in the use of pneumatic power means for moving the blades to cutting position.

The rotor 13' is in this case continuously rotated, centrifugal force acting to move the arms 26' and 27' outwardly to blade open or non-cutting position. A cable end is inserted through the aligned openings 66 and 64, until it strikes the adjacent end of the index rod 48'. Having set the nut 56' for the desired depth of cut, air or other operating fluid under pressure is now admitted behind the piston 72, through the inlet 78, which moves over the tapers 54' and 55' to cause the arms to move inwardly and carry the cutting edges of the cutting blades to the desired cutting depth as determined by the setting of nut 56', at which point the piston strikes the stop ring 80. By now manually applying an outward pulling force on the cable, while the blades are in cutting position, the severed end material will be stripped. The fluid pressure acting on the piston is then released, whereupon the spring 79 restores the piston to retracted position and centrifugal force moves the cutter blades to non-cutting position ready to receive the next cable end to be operated upon.

Referring to Figs. 6 and 7, there are schematically illustrated several types of cutters which may be utilized. As shown in Fig. 6, one of the cutters as indicated by numeral 84 is provided with a flat surface 85 which serves as an anvil against which the cutting edge 86 of the other cutter 87 is adapted to cooperate. In this arrangement, a high degree of accuracy of cutting is obtained since one of the cutters merely bears against the side of the outer periphery of the cable, while the single cutting edge 86 operates to do the cutting. Thus there is no problem of differences of adjustment which might exist between two associated cutting edges.

In the arrangement shown in Fig. 7, the cutters are provided with thickened shank portions 88 while a projecting blade portion 89 of reduced thickness is provided. This blade, as shown, is provided with a thirty degree bevelled cutting edge as indicated at 90. At the inner terminus of the blade portion 89, the portion of the shank 88 forms an offset shoulder 91 which is spaced from the cutting edge of the blade. With this arrangement, a very clean cut is obtained without deforming the respective layers of the cable wire covering.

From the foregoing description, it is apparent that the cable stripping apparatus described herein accomplishes the objects as previously set forth.

Various modifications may suggest themselves to those skilled in the art without departing from the spirit of our invention, and, hence, we do not wish to be restricted to the specific forms shown or uses mentioned, except to the extent indicated in the appended claims.

We claim:

1. Cable stripping apparatus, comprising: a rotatable part; a pair of oppositely disposed cutting elements carried by said part and mounted thereon for relative movements respectively to cooperative cutting position and to a non-cutting position; means operative by centrifugal force for moving the cutting elements to one of said positions; means operative to move the cutting elements to the other of said positions; and adjustable stop means limiting the extent of movement of said elements and their cutting depth at the cutting position.

2. Cable stripping apparatus, comprising: a rotatable part; a pair of elongate arms extending generally along the axis of rotation of said part, each of said arms having an outer taper portion; cutting elements respectively carried by said arms; means respectively connecting said arms to said part for relative outward and inward swinging movements to carry said elements to a cooperative cutting position, and to a non-cutting position; means for actuating said arms; and means coacting with the taper portion of each of said arms to terminate its swinging movement for positioning the elements in cutting position and thereby determine their cutting depth.

3. Cable stripping apparatus, comprising: a rotatable part; a pair of elongate arms extending generally along the axis of rotation of said part, each of said arms having an outer taper portion; cutting elements respectively carried by said arms; means respectively connecting said arms to said part for relative swinging movements to carry said elements to a cooperative cutting position, and to a non-cutting position; means operative by centrifugal force for moving said elements to one of said positions; means for actuating said arms; and means axially adjustable along the axis of rotation coacting with the taper portion of each of said arms to terminate its swinging movement for positioning the elements in cutting position and thereby determine the cutting depth of the elements.

4. Cable stripping apparatus, comprising: a rotatable part; a pair of elongate arms extending generally along the axis of rotation of said part, each of said arms having an outwardly positioned taper portion; cutting elements respectively carried by said arms; means respectively connecting said arms to said part for relative swinging movements to carry said elements to a cooperative cutting position and to a non-cutting position; means for actuating said arms; and means surrounding said arms and coacting with the taper portion of each of said arms to terminate its swinging movement for positioning the elements in cutting position and thereby determine their cutting depth, said latter means including a member adjustably positionable lengthwise along said arms to adjustably vary the point of termination of said swinging movement and the consequent cutting depth.

5. Cable stripping apparatus, comprising: a rotatable part; a pair of elongate arms extending generally along the axis of rotation of said part, each of said arms being pivotally supported between its ends on said part for swinging movements; cooperable cutting elements carried by said arms positioned on one side of said pivots; surfaces respectively on said arms on the opposite side of said pivots providing tapers, said arms moving outwardly under the action of centrifugal force upon rotation of said part, and thereby moving the cutting elements to cutting position; spring means for actuating the arms upon termination of the rotation of said part to move the cutting elements away from the cutting position; and stop means coacting with the tapers of said arms for determining the cutting depth of said cutting elements.

6. Cable stripping apparatus, comprising: a rotatable part; a pair of elongate arms extending generally along the axis of rotation of said part, each of said arms being pivotally supported between its ends on said part for swinging movements; cooperative cutting elements carried by said arms positioned on one side of said pivots; surfaces respectively on said arms on the opposite side of said pivots providing tapers, said arms moving outwardly under the action of centrifugal force upon rotation of said part, and thereby moving the cutting elements to cutting position; spring means for actuating the arms upon termination of the rotation of said part to move the cutting elements away from the cutting position; and stop means coacting with the tapers of said arms for determining the cutting depth of said cutting elements, said stop means being adjustably positionable along said tapers.

7. Apparatus for stripping wires and cables, comprising: a rotatable part; a pair of oppositely disposed cutting elements carried by said part and mounted thereon for relative swinging movements towards and away from a cooperative cutting position; means for swinging said elements including an annular member surrounding said part, said member being axially movable in one direction to cause a swinging movement of said elements towards the cutting position; and an adjustable abutment engageable by said member in its movement in said one direction to vary the cutting depth of said cutting elements.

8. Apparatus for stripping wires and cables, comprising: a housing having a tubular portion; a shaft rotatably supported in said housing; a pair of elongate arms extending generally along said shaft, each of said arms being similarly pivotally supported at its inner end on said shaft for swinging movements and having a taper portion; cooperable cutting elements carried by said arms at their outer ends; a tubular member within said tubular portion of the housing and sealed at one end relative thereto, said tubular member and tubular portion coacting to provide an annular cylinder; a sleeve piston reciprocable in said cylinder; an anti-friction bearing carried by said piston, and surrounding said arms at their taper portions, said bearing having an outer race anchored to said piston and an inner race engageable by said arms upon outward movement thereof under centrifugal force; means for admitting a fluid to said cylinder to move said piston in a direction to cause movement of the cutting elements to a cutting position; a spring for moving said piston in an opposite direction; and stop means for limiting the extent of movement of said piston in said first direction.

9. Apparatus for stripping wires and cables, comprising: a housing; a shaft rotatably supported in said housing; a pair of elongate arms extending generally along said shaft, each of said arms being similarly pivotally supported at its inner end on said shaft for swinging movements and having a taper portion; cooperable cutting elements carried by said arms at their outer ends; annular means surrounding said arms at their taper portions and cooperable with the taper portions, when axially moved in one direction, to swing the arms and move the cutting elements to a cutting position, and when moved in an opposite direction enable movement of the arms under centrifugal force to move the cutting elements to a non-cutting position; fluid-cylinder means energizable to move the annular means in said one direction; spring means for moving the annular means in said opposite direction; and an abutment member for limiting the movement of the annular means in said one direction, whereby the cutting depth of said cutting elements is determined.

10. Apparatus for stripping wires and cables, comprising: a housing; a shaft rotatably supported in said housing; a pair of elongate arms extending generally along said shaft, each of said arms being similarly pivotally supported at its inner end on said shaft for swinging movements and having a taper portion; cooperable cutting elements carried by said arms at their outer ends; annular means surrounding said arms at their taper portions and cooperable with the taper portions, when axially moved in one direction, to swing the arms and move the cutting elements to a cutting position, and when moved in an opposite direction enable movement of the arms under centrifugal force to move the cutting elements to a non-cutting position; fluid-cylinder means energizable to move the annular means in said one direction; spring means for moving the annular means in said opposite direction; and an abutment member for limiting the movement of the annular means in said one direction, whereby the cutting depth of said cutting elements is determined, said abutment member being adjustable to vary the cutting depth.

11. Apparatus for stripping wires and cables, comprising: a housing; a shaft rotatably supported in said housing; a pair of elongate arms extending generally along said shaft, each of said arms being similarly pivotally supported at its inner end on said shaft for swinging movements and having a taper portion; cooperable cutting elements carried by said arms at their outer ends; annular means surrounding said arms at their taper portions and cooperable with the taper portions, when axially moved in one direction, to swing the arms and move the cutting elements to a cutting position, and when moved in an opposite direction enable movement of the arms under centrifugal force to move the cutting elements to a non-cutting position; power means including an actuating element connected to said annular means, said power means being energizable to move the annular means in said one direction; an abutment member supported on said housing for movement along said arms; spring means extending between said abutment member and said annular means for biasing movement thereof in said one direction; and means for adjustably varying the position of said abutment to control the cutting depth of said cutting elements.

12. Apparatus for stripping wires and cables, comprising: a housing; a shaft rotatably supported in said housing; a pair of elongate arms extending generally along said shaft, each of said arms being similarly pivotally supported at its inner end on said shaft for swinging movements and having a taper portion; cooperable cutting elements carried by said arms at their outer ends; annular means surrounding said arms at their taper portions and cooperable with the taper portions, when axially moved in one direction, to swing the arms and move the cutting elements to a cutting position, and when moved in an opposite direction enable movement of the arms under centrifugal force to move the cutting elements to a non-cutting position; power means including an actuating element connected to said annular means, said power means being energizable to move the annular means in said one direction; spring means for moving the annular means in said opposite direction; and an abutment member for limiting the movement of the annular means in said one direction, whereby the cutting depth of said cutting elements is determined.

13. Apparatus for stripping wires and cables, comprising: a housing; a shaft rotatably supported in said housing; a pair of elongate arms extending generally along said shaft, each of said arms being similarly pivotally supported at its inner end on said shaft for swinging movements and having a taper portion; cooperable cutting elements carried by said arms at their outer ends; annular means surrounding said arms at their taper portions and cooperable with the taper portions, when axially moved in one direction, to swing the arms and move the cutting elements to a cutting position, and when moved in an opposite direction enable movement of the arms under centrifugal force to move the cutting elements in a non-cutting position; power means including an actuating element connected to said annular means, said power means being energizable to move the annular means in said one direction; an abutment member supported on said housing for movement along said arms; spring means extending between said abutment member and said annular means for biasing movements thereof in said one direction; and indexing means for adjustably varying the position of said abutment to control the cutting depth of said cutting elements.

14. Apparatus for stripping insulation covering from wires and cables, comprising: a rotatable part; a pair of oppositely disposed cutting elements carried by said part and mounted thereon for relative movements respectively to a cooperative cutting position and to a non-cutting position; means operative by centrifugal force for moving the cutting elements to one of said positions, one of said elements having a flat working surface adapted to engage an outer surface of the wire insulation and form an anvil, and the other of said elements having a cutting working edge positioned over the flat surface and adapted to sever the insulation upon rotation of said part; means operative to move the cutting elements to the other of said positions; and adjustable stop means limiting the extent of movement of said elements and the cutting depth of said cutting working edge.

15. Apparatus for stripping wires and cables, comprising: a rotatable part; a pair of oppositely disposed cutting elements carried by said part and mounted thereon for relative movements respectively to a cooperative cutting position and to a non-cutting position, movement to one of said positions being effected by centrifugal force, said cutting elements each comprising a blade portion of reduced thickness terminating at its outer end in a beveled cutting edge, and at its inner end being joined with a thickened portion defining an offset shoulder spaced from said beveled edge; means operative to move the cutting elements to the other of said positions; and adjustable stop means limiting the extent of movement of said elements and their cutting depth at the cutting position.

References Cited in the file of this patent

UNITED STATES PATENTS

| | | |
|---|---|---|
| 1,131,473 | Courtney | Mar. 9, 1915 |
| 1,388,398 | Adams | Aug. 23, 1921 |
| 1,433,320 | Wersel | Oct. 24, 1922 |
| 1,661,180 | Johnson | Mar. 6, 1928 |
| 1,699,805 | Ocko | Jan. 22, 1929 |
| 1,722,087 | Hartman | July 23, 1929 |
| 1,784,298 | Mahan | Dec. 9, 1930 |
| 1,815,500 | Doan | July 21, 1931 |
| 2,421,310 | Berlincourt | May 27, 1947 |
| 2,701,489 | Osborn | Feb. 8, 1955 |